United States Patent [19]

Hadermann et al.

[11] Patent Number: 4,474,905
[45] Date of Patent: Oct. 2, 1984

[54] FREEZE BLENDING OF REACTIVE LIQUIDS AND SOLIDS

[75] Inventors: Albert F. Hadermann, Ijamsville, Md.; Paul F. Waters, Washington, D.C.; Jerry C. Trippe, Fairfax Station, Va.

[73] Assignee: General Technology Applications, Inc., Reston, Va.

[21] Appl. No.: 469,423

[22] Filed: Feb. 24, 1983

Related U.S. Application Data

[63] Continuation-in-part of Ser. No. 249,622, Sep. 30, 1982.

[51] Int. Cl.$^3$ ............................................. C08K 3/00
[52] U.S. Cl. ........................... 523/152; 523/153; 523/155; 523/156; 523/157; 523/158; 523/307; 523/309
[58] Field of Search .............. 523/152, 153, 155, 156, 523/307, 309; 241/23

[56] References Cited

U.S. PATENT DOCUMENTS

| | | | |
|---|---|---|---|
| 3,651,008 | 3/1972 | Moser et al. | 523/309 |
| 3,771,729 | 11/1973 | Frable | 241/23 |
| 3,896,075 | 7/1975 | Longley | 523/153 |
| 4,273,699 | 6/1981 | Chester | 523/153 |
| 4,373,038 | 2/1983 | Moraw et al. | 523/156 |

Primary Examiner—Lewis T. Jacobs
Attorney, Agent, or Firm—Roland H. Shubert

[57] ABSTRACT

Chemically reactive liquids such as catalyzed monomers and prepolymers are mixed with finely divided solids to form a homogeneous blend by chilling the liquid to a temperature below its solidification point, forming it into finely divided solidly frozen particulates, chilling the finely divided solids to a temperature below the solidification temperature of the reactive liquid and mixing the materials together without allowing the temperature to rise to the liquid solidification point. The admixture may then be formed into a permanent shape by warming to a temperature whereat the frozen liquid melts and the liquid is caused to react.

10 Claims, 1 Drawing Figure

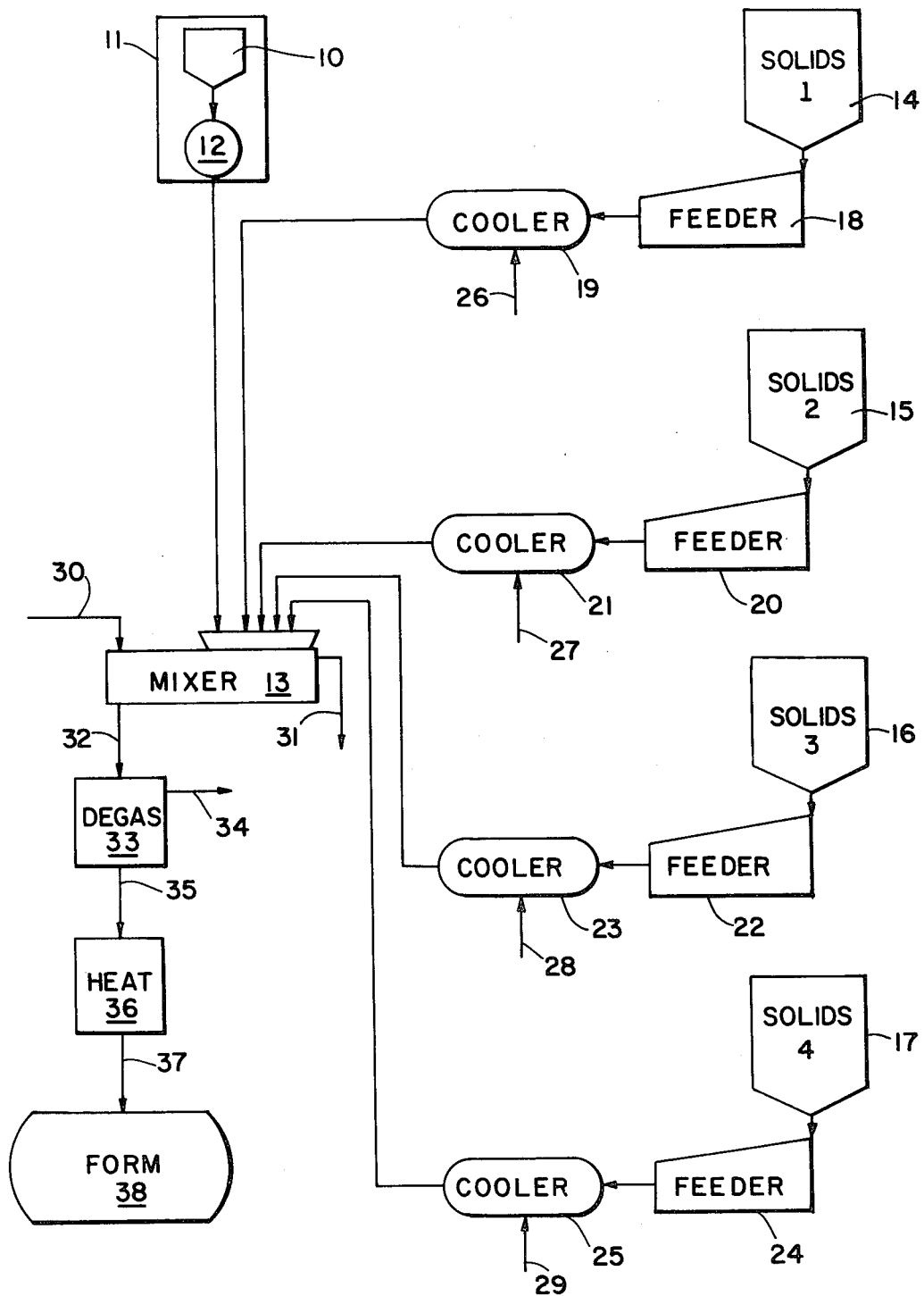

FREEZE BLENDING OF REACTIVE LIQUIDS AND SOLIDS

CROSS-REFERENCE TO RELATED APPLICATIONS

This application is a continuation-in-part of U.S. patent application Ser. No. 429,622, filed Sept. 30, 1982.

A variety of common industrial processes require the mixing or blending of solids with reactive liquids. It is usually necessary to accomplish the mixing or blending before substantial reaction of the liquid occurs. Typical of these processes are those which blend solid materials, often at high loadings, with a monomer or liquid prepolymer which later reacts to form a solid matrix. Specific examples include the fabrication of fiber reinforced structural shapes and the production of friction products such as clutch facings and brake pads.

It is often desired to fabricate structural shapes, panels, domes, cylinders and the like, with a high loading of dispersed reinforcing fibers, typically in the form of chopped filament or staple fiber. Production of friction products such as brake pads, particularly those which do not contain asbestos, requires both a high solids loading and the use of reinforcing fibers to secure the desired wear life and adequate physical strength.

Compounding products containing high solids loadings is often accomplished by use of mechanical mixers which produce a high shear, kneading type of action. These severe mixing conditions are necessary to evenly disperse the solid particles throughout the prepolymer or monomer and to thoroughly wet each of the particles with the liquid. Mixing times are usually prolonged, ranging from many minutes to several hours. Brittle fibers such as glass, graphite or some metal whiskers cannot be incorporated into composites by these mixing techniques as they are broken even to the point of being reduced to dust by the severity of the shearing action during compounding. Consequently, brittle fibers are typically incorporated into structural composites as woven fabrics or as mats made by depositing chopped roving onto a conveyor, spraying a binder to hold the fibers in a random arrangement, and heat setting the binder as the conveyor passes through an oven.

A process for the solid state reaction of normally solid materials is disclosed in a copending commonly owned U.S. patent application, Ser. No. 375,653 entitled "Process for Solid State Free Radical Reactions" which application is a continuation of application Ser. No. 198,385, now abandoned. It is also a counterpart to European Application No. 81304910.3 published in April, 1982. The process described in these applications involves the generation of free radicals on the surfaces of at least one of the solids by mechanical working, as by grinding, at cryogenic temperatures. Solid state free radical reactions between the same or different materials is then induced. At least one of the solid materials is a polymer while the other may be a second polymer, a catalyst, a lubricity enhancing material, a filler or a pigment.

SUMMARY OF THE INVENTION

Relatively finely divided solids are mixed with chemically reactive liquids, typically catalyzed monomers or prepolymers, to form a homogeneous, unreacted blend which then may be formed into a desired shape and allowed to react or cure. The chemically reactive liquid is cooled to a temperature below its solidification temperature and below the temperature at which chemical reaction proceeds at any significant rate and is formed into finely divided solid particulates. Frozen particles of the reactive liquid are mixed or blended with the finely divided solid material using a solids-solids blender, preferably of the type utilizing a convective mixing mechanism, either in batch fashion or continuously. Alternatively, the frozen liquid particles may be mixed with the other material as a slurry in an inert liquid cryogenic refrigerant using conventional liquid-solids blending techniques and equipment. The resulting homogeneous blend may be formed into a desired shape by packing the powder blend into a mold, by rapidly warming the blend to a plastic state and thereafter casting, or by extrusion, pultrusion, or similar techniques.

The process is particularly advantageous in the manufacture of polymer bound composites having a high solids loading. Examples of such composites include friction products such as clutch facings and brake pads and highly reinforced structural shapes.

Hence, it is an object of this invention to obtain homogeneous blends of solids with reactive liquids.

It is another object of this invention to provide processes for the manufacture of polymer bound composites having high solids loadings.

One specific object of this invention is to provide techniques for the fabrication of polymer bonded friction products.

Other objects of this invention will become apparent in the following description of certain preferred embodiments.

BRIEF DESCRIPTION OF THE DRAWING

The sole FIGURE is a schematic diagram of a preferred embodiment of this invention in which several different solid materials are blended with a reactive liquid.

DESCRIPTION OF PREFERRED EMBODIMENTS

The process of this invention comprises generally the steps of chilling a chemically reactive liquid and forming the chilled liquid into finely divided, solidly frozen particles, chilling particulate solids to approximately the temperature of the frozen liquid particles and mixing the two different materials together to form a homogeneous blend. Thereafter, the blended mixture may be formed into a desired shape before, during or directly after heating the mixture to a temperature whereat the frozen liquid melts and becomes chemically reactive.

Liquids contemplated generally for use in this process are those which react as by polymerization or crosslinking to form a solid as well as those liquids which are chemically reactive with another component of a desired admixture to cause a change in the physical properties thereof. Liquid systems specifically useful in this invention include monomers and prepolymers which are catalyzed or otherwise activated to polymerize or cross-link to form a solid. As used in this disclosure, the term "liquids" includes those monomers and other reactive compounds which are gaseous at ambient temperature and pressure but which can be handled as a liquid by cooling or under pressure.

As a first step in this process, the liquids are cooled to a temperature below their freezing or solidification point and are formed into finely divided particles. This may be accomplished in different ways. The liquid may be sprayed through a nozzle to form droplets of the desired small size and chilled by contact with a cold gas to solidify the droplets. Liquid may be sprayed directly into an inert liquid refrigerant, suitably liquid nitrogen, to again form solid particles. Alternatively, the liquid may be frozen in bulk and thereafter comminuted through use of a hammer mill or similar device. Many of the monomers and prepolymers become quite brittle when chilled to a temperature substantially below their solidification point and are easily comminuted by impact type grinding means. Grinding the monomer or prepolymer may conveniently be accomplished in the manner described in commonly owned U.S. Pat. No. 4,340,076. Because some localized heating occurs in the grinding operation and because frozen monomers and prepolymers tend to be quite brittle at cryogenic temperatures, it is preferred to conduct grinding or comminuting operations at a temperature far below the solidification point of the monomer or prepolymer using, for example, liquid nitrogen as a cryogenic refrigerant. In any event, it is generally necessary to maintain a temperature at least about 10° C. below the solidification temperature during grinding and mixing operations to avoid localized heat build-up and particle agglomeration.

Those solid particulate materials to be incorporated into the composite are also cooled or chilled to a temperature below the solidification temperature of the reactive liquid and preferably to or below the temperature of the finely divided frozen liquid particles. Chilling of solid particulate materials is best accomplished by direct contact with a refrigerant gas or liquid. For example, the solid particulate materials may be chilled by contact with liquid nitrogen or with cold nitrogen gas obtained from the vaporization of liquid nitrogen. A variety of refrigerant liquids or gasses may be used provided that the refrigerants are inert to all of the components making up the composite.

Thereafter, the chilled solid particulate materials are mixed with the frozen particles of the reactive liquid using conventional solids-solids mixing techniques. Care must be taken during the mixing step to ensure that temperature of the admixture does not rise to the melting point of the reactive liquid. If the temperature were allowed to rise so that surface melting of frozen liquid particles occurs, then there tends to result localized agglomeration which precludes the obtaining of a homogeneous blend. Melting problems may be avoided by utilizing a well insulated mixer, by introducing the components into the mixer at a temperature substantially below the solidification point of the reactive liquid and by supplemental cooling during the mixing process.

Alternatively, the components of the desired composite can be mixed as a slurry in a liquid cryogenic refrigerant adapting for use conventional liquids-solids mixing devices. In this embodiment, it is preferred that the liquid cryogenic refrigerant be liquid nitrogen. Excess liquid nitrogen can readily be filtered from the mixed composite materials leaving a dry blend.

After the mixing is completed and a homogeneous blend is obtained, the mixture is de-gassed, heated and formed into a desired shape. These steps may be accomplished sequentially or simultaneously. Heating the admixture, which may be accomplished simply by allowing it to rise toward ambient temperature, will typically produce a viscous, plastic blend similar in physical properties to that obtained by the conventional high shear mixing of solids with a prepolymer or similar liquid. In this form the admixture may be cast into molds, may be extruded, or may be otherwise shaped to form the desired configuration. Alternatively, the cold particulate mixture may be packed into a mold, warmed, de-gassed and allowed to react or cure then forming the desired product shape.

Turning now to the FIGURE, there is shown a generalized flowsheet illustrating a preferred embodiment of this invention. There is provided a supply of finely divided, solidly frozen particles of reactive liquid 10 maintained at a temperature below the liquid solidification point within insulated or refrigerated enclosure 11. Feeding or delivery means 12 is provided to supply metered or measured quantities of the frozen liquid particles to mixer 13.

There is also provided a number of supply vessels, 14, 15, 16, and 17 each holding a different particulate solid to be incorporated into the desired composite. These supply vessels may conveniently be held at ambient temperature. Associated with each supply vessel is a feeder and cooler pair, 18 and 19, 20 and 21, 22 and 23, and 24 and 25 respectively, arranged to supply metered or measured quantities of each solid, chilled to temperatures below the solidification point of the reactive liquid, from the solid supply vessel to mixer 13. While chilling may be accomplished by either indirect or direct contact heat exchange, it is preferred to supply gaseous refrigerant via means 26, 27, 28 and 29, respectively, for indirect contact with the particulate solids in each of the coolers.

The process as described may be carried out either on a batch or continuous basis and the type of mixer 13 is selected accordingly. It is important to select the type of mixer which will produce a high degree of homogeneity of the resulting blend. In general, those mixers utilizing a convection type of mixing mechanism are preferred. Because mixing produces a certain degree of heating it may be advantageous to provide additional cooling directly to the mixer as by addition of small quantities of a liquid cryogenic refrigerant such as liquid nitrogen directly into the mixer by way of conduit 30. Gas may be vented from the mixer via vent means 31 and the cold gas may then be directed to one or more of the solids coolers.

A homogeneous blend 32 of the admixed frozen liquid particles with the solid components may then be passed from mixer 13 to de-gassing means 33 wherein residual liquid refrigerant, if any, is removed by vacuum means 34. The admixture may then be passed via means 35 to heating zone 36 and warmed up to a temperature above the melting point of the frozen liquid particles to form a viscous fluid material 37 which may be cast or otherwise shaped in conventional fashion in forming means 38. While de-gassing, heating and forming are depicted as separate process steps, they can also be carried out concurrently. For example, heating and de-gassing can be incorporated with the casting step in the manufacture of friction products.

A description of certain specific applications of the generalized process described in the FIGURE will serve to more fully illustrate the invention. The invention offers substantial advantages in the manufacture of friction products and structural shapes as compared to conventional techniques. In this embodiment, the reactive liquid 10 may be an epoxy compound mixed with a hardener such as an aliphatic amine. It is preferred that plasticizers, cross-linking agents, accelerating agents and catalysts used in the formulation be added to the liquid prepolymer or monomer. Addition of cross-linking agents, catalysts and the like directly to the reactive liquid ensures a thorough and uniform dispersion of those materials in the liquid. Promptly thereafter, before any significant degree of reaction occurs, the catalyzed liquid is chilled, solidified and formed into finely divided particles. Because chemical reaction is reduced to an insignificant level or stopped completely by chilling and solidifying the reactive liquid, time constraints on further processing steps are minimal. More importantly, highly reactive catalysts may be used to obtain very rapid cure times as pot life of the reactive liquid becomes a consideration only during the final forming step.

In the manufacture of friction products such as brake pads and in the fabrication of structural composites, it is generally advantageous to employ fibrous reinforcing materials. These fibrous reinforcing materials are advantageously in the form of relatively small diameter, staple length or chopped fibers or filaments including for example carbon and graphite fibers, glass fibers, steel and other metal fibers, aramid and other high strength polymeric fibers and the like. For the purposes of this disclosure, the term "particulate solid" specifically includes particles of high aspect ratio such as chopped filaments and staple length fibers.

Solids material 1 in supply vessel 14 may be a brittle fiber such as graphite. Solids 2 from supply vessel 15 may be a different reinforcing fiber such as a metallic whisker. Vessel 16 may supply a wear resisting particulate solid such as aluminum oxide while vessel 17 may supply a particulate solid imparting different characteristics to the composite such as calcium carbonate. The various components of the desired composite are fed in metered or measured manner through the respective coolers to mixer 13.

As was set out previously, the process may be carried out on either a batch or continuous basis. In certain instances, operation of the process in a continuous mode offers unique advantages compared to conventional mixing techniques. It is often advantageous in the fabrication of structural composites, particularly those of large size and complexity, to vary the ratio or kind of reinforcing fibers, fillers or other components over the extent of the structure. Continuous mixing as set out in the flowsheet coupled with continuous forming or casting of the mixed composite materials allows for the capability of varying the ratio of components in a predetermined pattern. This is done by changing the ratio of components fed to mixer 13 in a programmed manner to correspond to the composition desired for individual sections or areas of the structure being fabricated.

The following example will illustrate certain specific embodiments of the invention.

EXAMPLE

A commercial epoxy resin was mixed with a polyamine-polyamide hardener and was then solidified using liquid nitrogen. The mixed resin was ground to a powder at liquid nitrogen temperatures and the powder was mixed with relatively coarsely ground calcium sulfate, precooled to liquid nitrogen temperature, using liquid nitrogen to maintain both components at cryogenic temperature during mixing. The calcium sulfate made up about 35% by weight of the total composite.

The cold powder mixture was then placed into a container and was allowed to warm and cure overnight. There resulted a hard, completely cured composite which showed some evidence of particle settling. This settling was not unexpected due to the low level of solids loading and the relatively large, approximately 20 mesh, size of the largest particles.

The invention herein described is most advantageously used in those systems employing high solids loadings, i.e., above about 80% by weight, and viscous prepolymer liquids. When either highly mobile monomers or relatively light solids loadings are used then use of very rapid cure times will tend to eliminate solids settling or segregation. Such rapid cure times can be obtained through use of very active catalyst systems or by use of high intensity radiation to induce polymerization and cross-linking.

It is preferred to carry out this process at cryogenic temperatures, i.e., below the acetone-dry ice equilibrium temperature, using an inert cryogenic refrigerent such as liquid nitrogen. It is necessary in all cases to maintain temperature during the mixing step sufficiently below the melting or solidification temperature of the reactive liquid so as to preclude any possibility of surface melting. Any surface melting of the frozen reactive liquid particles tends to cause clumping and agglomeration which effectively precludes the obtaining of a homogeneous blend of the mixed solids.

It will be apparent to those skilled in the art that the described process can employ a large number of reactive liquid-solids systems not specifically enumerated in the description and example. Numerous changes can be made in the ingredients, proportions and conditions specifically disclosed without departing from the invention as defined in the appended claims.

We claim:

1. A method for the manufacture of solids loaded, polymer bonded, friction products and structural shapes which comprises:
   chilling a chemically reactive liquid monomer or prepolymer to a temperature at least 10° C. below its solidification point and forming said chilled liquid into finely divided, solidly frozen particulates;
   chilling solid particles to a temperature at least 10° C. below the solidification point of said reactive liquid;
   mixing the solidly frozen particulates of said reactive liquid with said chilled solid particles while maintaining the temperature sufficiently low to avoid melting of said reactive liquid;
   warming the resulting admixture to a temperature above the melting point of said reactive liquid and forming it into a shape; and
   causing said liquid to react by polymerization and/or cross/linking to form a solid polymer matrix binding said solid particles.

2. The method of claim 1 in which said chemically reactive liquid is formed into tiny liquid droplets which are thereafter frozen by contact with a liquid or gaseous refrigerant to form finely divided, free flowing particulates.

3. The method of claim 1 wherein said reactive liquid is first solidified and is thereafter comminuted to form finely divided free flowing particulates.

4. The method of claim 1 wherein said reactive liquid is chilled to cryogenic temperatures.

5. The method of claim 4 wherein said reactive liquid and said finely divided solid are chilled by contact with liquid nitrogen.

6. The method of claim 1 wherein said finely divided solid comprises a fibrous reinforcing material.

7. The method of claim 6 wherein said fibrous reinforcing material is a brittle fiber.

8. The method of claim 1 wherein catalysts and/or cross-linking agents are introduced into the reactive liquid prior to forming it into solidly frozen pariculates.

9. The method of claim 8 wherein said reactive liquid comprises a mixture of an epoxy compound and a hardening agent.

10. The method of claim 1 wherein said friction product is a brake pad or clutch facing.

* * * * *